United States Patent
Das Sharma et al.

(10) Patent No.: US 7,916,750 B2
(45) Date of Patent: Mar. 29, 2011

(54) TRANSACTION LAYER PACKET COMPRESSION

(75) Inventors: Debendra Das Sharma, Santa Clara, CA (US); Ajay V. Bhatt, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 11/321,370

(22) Filed: Dec. 28, 2005

(65) Prior Publication Data

US 2007/0147426 A1    Jun. 28, 2007

(51) Int. Cl.
*H04J 3/16* (2006.01)
(52) U.S. Cl. .................................... 370/469; 710/105
(58) Field of Classification Search ................ None
See application file for complete search history.

(56) References Cited

U.S. PATENT DOCUMENTS

| | | | |
|---|---|---|---|
| 6,009,488 A | 12/1999 | Kavipurapu | |
| 6,477,101 B2 * | 11/2002 | Cavaleri et al. | 365/221 |
| 7,000,166 B2 * | 2/2006 | Hata et al. | 714/746 |
| 7,152,136 B1 * | 12/2006 | Charagulla | 710/315 |
| 7,257,655 B1 * | 8/2007 | Burney et al. | 710/105 |
| 7,307,552 B2 * | 12/2007 | Ma et al. | 341/51 |
| 7,401,243 B2 * | 7/2008 | Knepper et al. | 713/322 |
| 7,577,896 B2 * | 8/2009 | Uzrad-Nali et al. | 714/758 |
| 7,660,611 B1 * | 2/2010 | Asbury et al. | 455/574 |
| 2006/0039677 A1 * | 2/2006 | Ogikubo | 386/68 |
| 2007/0050620 A1 * | 3/2007 | Pham et al. | 713/165 |
| 2007/0061414 A1 * | 3/2007 | Bakke | 709/217 |
| 2007/0109153 A1 * | 5/2007 | Ma et al. | 341/50 |
| 2007/0130397 A1 * | 6/2007 | Tsu | 710/62 |
| 2007/0214308 A1 * | 9/2007 | Pope et al. | 711/100 |

* cited by examiner

*Primary Examiner* — Seema S Rao
*Assistant Examiner* — Rhonda Murphy
(74) *Attorney, Agent, or Firm* — Derek J. Reynolds (57) ABSTRACT

A system, method, and device are disclosed. In one embodiment, the device comprises logic to determine whether a received transaction layer packet (TLP) has a compressed header and, if the received TLP has a compressed header, logic to decompress the header.

13 Claims, 7 Drawing Sheets

Unchained TLPs

Chained TLPs

TRANSACTION LAYER PACKET
COMPRESSION

FIELD OF THE INVENTION

The invention relates to transaction layer packet compression and decompression techniques. More specifically, the invention relates to PCI-EXPRESS™.

BACKGROUND OF THE INVENTION

The PCI Express™ interface protocol, as defined by the PCI Express Base Specification, Revision 1.0a(Apr. 15, 2003), is fast becoming a widely used standard across the computer industry as a high-speed data communication link. Although a PCI-Express™ link allows for a large amount of data to transfer between two devices quickly, there always exists the need for more data throughput. One way of increasing the data throughput, without increasing the number of lanes or the clock frequency of the interconnect, is to compress the data that is transferred. General data compression schemes are ubiquitous throughout the computer industry. These data compression schemes would compress the data payloads of PCI-Express™ packets, but the transactional overhead, such as addresses, reserved bit fields, and special characters are not compressed with a general data compression scheme.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a system, method, and device to implement PCI-Express™ Transaction Layer Packet compression are disclosed. In the following description, numerous specific details are set forth. However, it is understood that embodiments may be practiced without these specific details. In other instances, well-known elements, specifications, and protocols have not been discussed in detail in order to avoid obscuring the present invention. For the purposes of some embodiments, it is assumed that the transaction layer packet (TLP) traffic class (TC) is equal to zero. For read and write requests, it is assumed that all byte enables (BEs) are 1's. Also it is assumed that the Tag field for non-posted (NP) transactions follows a strict increased numbering scheme (0-255 in increments of 1) once compression is activated.

Figure 1:
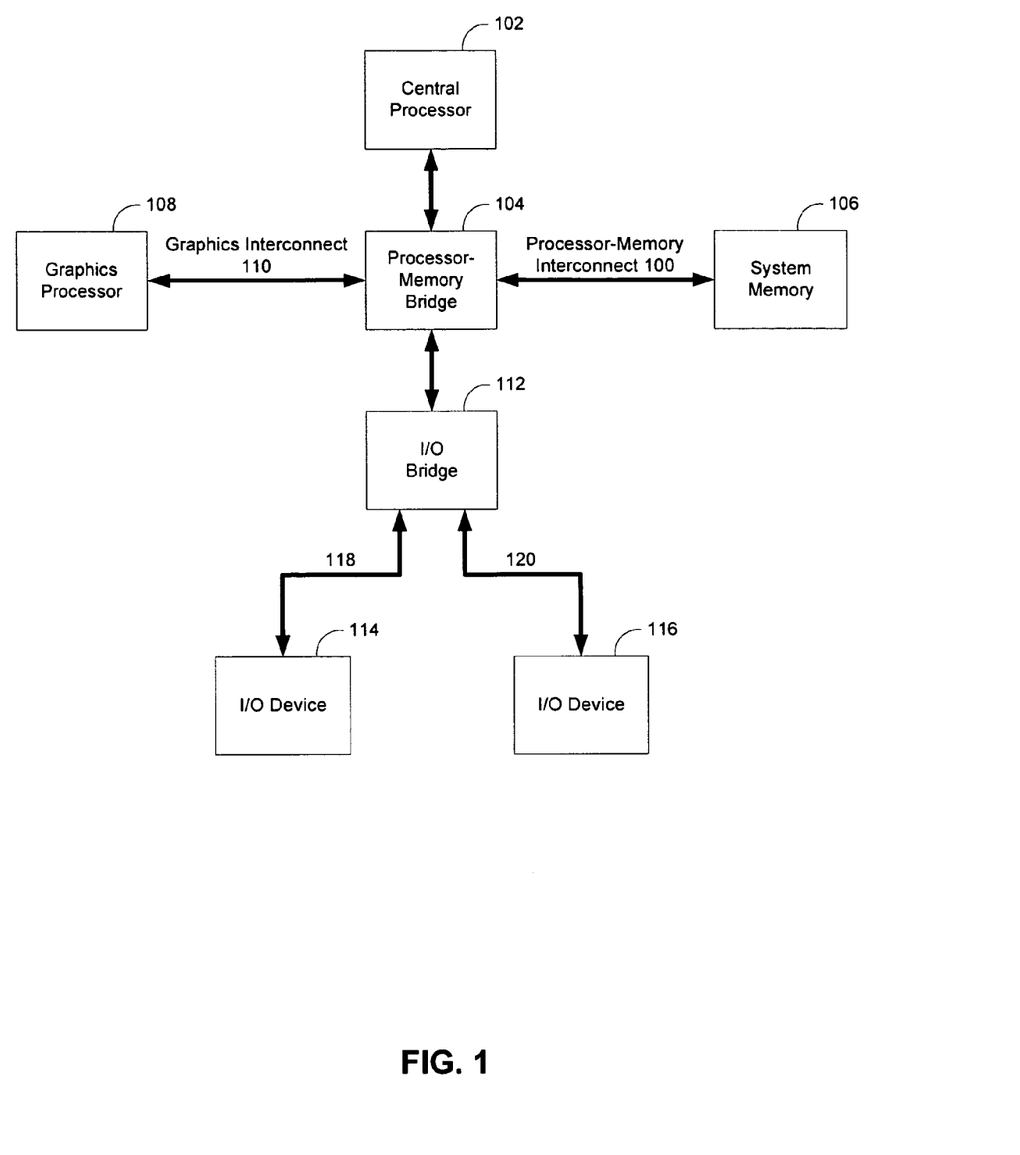
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110.

In one embodiment, I/O devices 114 and 116 are coupled to system I/O interconnects 118 and 120 and to processor-memory interconnect 100 through I/O bridge 112 and processor-memory bridge 104. I/O Bridge 112 is coupled to processor-memory interconnect 100 (through processor-memory bridge 104) and system I/O interconnects 118 and 120 to provide an interface for an I/O device to communicate with a device on the processor-memory interconnect 100.

In one embodiment, the computer system in FIG. 1 implements one or more PCI Express™ interconnects. In one embodiment, I/O devices 114 and 116 are PCI Express™ endpoints. In another embodiment, graphics interconnect 110 is a PCI Express™ x16 interconnect. In many embodiments, there are multiple PCI Express™ interconnects between different devices as shown in FIG. 1. Each of these interconnects shown may transfer significant amounts of data. If an interconnect cannot transfer data fast enough between to devices, overall system performance may be impacted. Although a PCI-Express™ interconnect can handle significant bandwidth requirements, there remains a need to allow an interconnect to effectively transfer greater amounts of data over a certain time period. One way to increase the bandwidth for data across a PCI-Express™ interconnect, without increasing the number of lanes or the clock frequency of the interconnect, is to remove a portion of the transactional overhead from each packet.

There are many types of transactions that are sent from device to device over a PCI-Express™ interconnect, each of which is in a transaction layer packet (TLP). Some of the most common are data reads, data writes, and completions.

There are a number of fields in a TLP. Table 1 describes each field in a standard TLP and its length in bits or double words (DWs).

TABLE 1

Standard (uncompressed) TLP fields.

| Field | Length |
| --- | --- |
| STP symbol marking the start of the compressed TLP. | 10 bits |
| Sequence number of the TLP. | 10 bits |
| Reserved. | 10 bits |
| Header. | 3-4 DW |
| Data payload. | 0-256 DW |
| Link CRC. | 1 DW |
| Symbol marking the end of the TLP. | 10 bits |

The first field in a standard TLP is a start transaction layer packet (STP) symbol. Symbols, sometimes referred to as K-characters, are defined in the PCI-Express™ specification. The STP symbol specifically is K27.7 and it signifies the start of a TLP. All symbols are 10 bits long. Each DW is 4 Bytes long which is transmitted/received as 4 symbols or 40 bits due to 8 bit/10 bit encoding.

The next field in a standard TLP is the sequence number of the TLP. When packets are grouped together, this field gives the receiver of the TLP information regarding the position of this TLP in a group of TLPs. This field is also 10 bits long.

The third field is reserved in the PCI-Express™ specification, thus this field has invalid data. The reserved field is also 10 bits long.

The fourth field is the header of the TLP. The header contains additional information regarding the TLP including the destination address. The definition of the header in the PCI-Express™ specification requires that the header is 3 or 4 DW.

The fifth field in the TLP is the data payload, which is the actual data transferred between two devices. Depending on the transaction, the length of this field can be anywhere from 0 to 256 DW. The PCI-Express™ specification limits a read transaction to only request up to 1024 DW of data payload. Additionally, there are certain transactions that are performed where there is no data payload (0 bytes).

The sixth field in the TLP is the link cyclic redundancy check (CRC) bits. The receiver link CRC logic performs a checksum operation to determine whether any information in the TLP is invalid due to data errors. The PCI-Express™ specification defines the CRC field's length as 1 DW.

Finally, the seventh field in the TLP is the symbol marking the end of the TLP. The END symbol specifically is K29.7 and is 10 bits in length.

As mentioned above, removing a portion of the transactional overhead of each TLP would increase data throughput. The transactional overhead of a given packet is the information sent other than the actual data payload. Data containing information such as addresses, CRC information, etc. are sent across the interconnect along with the data payloads. This information, if reduced in size, would allow a higher percentage of all data sent across a PCI-Express™ link to be data payload information, which would allow for higher throughput. Thus, a system, method, and device for eliminating or reducing the transactional overhead data is discussed. The system, method, and device include eliminating certain non-essential data within each TLP as well as compressing other data within each TLP that can be compressed.

Figure 2:
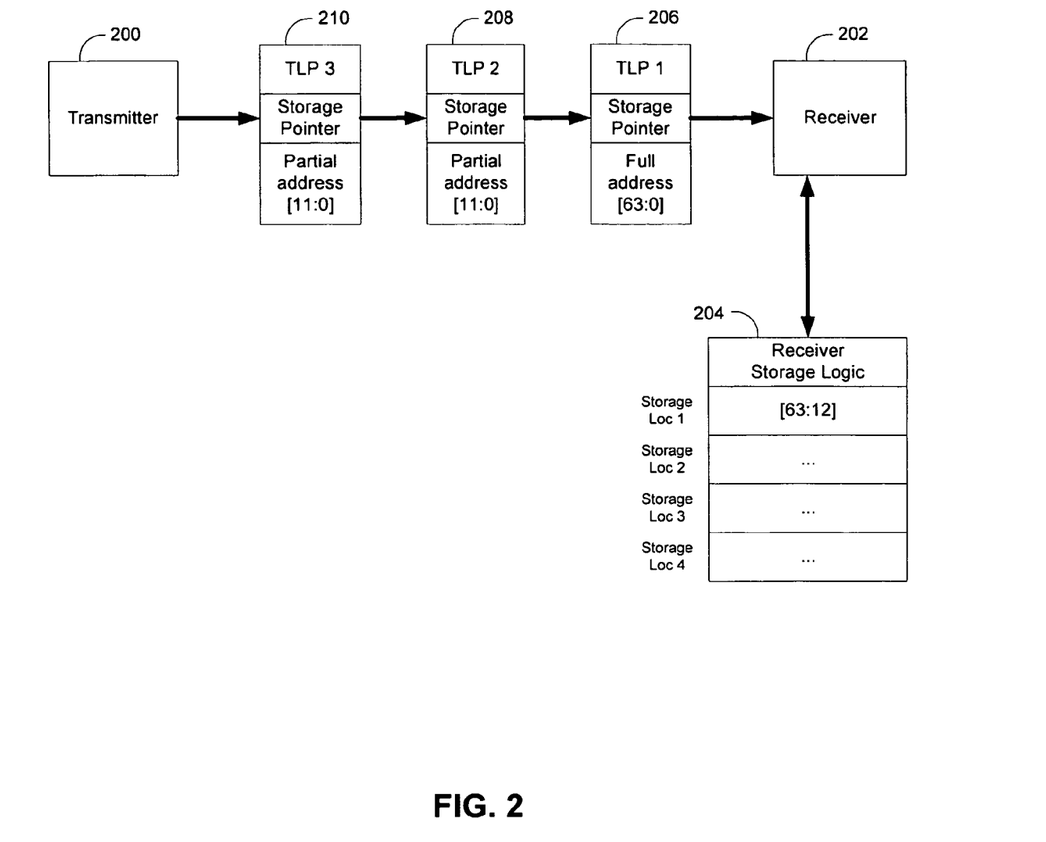
FIG. 2 illustrates an embodiment of TLP receiving logic to store a portion of a TLP header transmitted address for future use by other transmitted TLPs.

In one embodiment, the destination address within the header can be reduced in bit size in a majority of TLP packets transferred across the interconnect. FIG. 2 illustrates an embodiment of TLP receiving logic to store a portion of a TLP header transmitted address for future use by other transmitted TLPs. In this embodiment, a PCI-Express™ transmitter device 200 transmits a series of TLPs to a PCI-Express™ receiver device 202. The receiver device 202 is coupled to storage 204 (e.g., memory, registers, etc.) that can store one or more partial TLP header addresses. In this particular example, there are four storage locations, Storage Loc 1-4, for storing 4 separate partial addresses. In other embodiments, the number of storage locations could be any positive integer number such as 2, 8, 16, 32, etc. The transmitter 200 transmits TLP 1 (206), TLP 2 (208), and TLP 3 (210) in sequential order. In this embodiment, TLP 1 (206) includes a full 64-bit address in its header. TLP 1 also has a storage pointer that tells the receiver which location within the receiver storage logic to store a portion of the full address.

It is common in a chain of TLPs that the data targeted in requests in consecutive packets is contiguous and thus, is read from or written to contiguous memory space. Due to this commonality, it is frequently the case that a number of consecutive TLPs have a large portion of the same address, namely the upper bits of the address. This tendency is shown by way of example in FIG. 2. In this example, the three TLPs are transactions to consecutive memory locations. Thus, only the lower bits of the address change within each TLPs address. The largest TLP transaction that can be issued is a 4 KB read transaction, as defined by the PCI-Express™ specification. All other transactions, as well as most read transactions are less than the 4 KB data payload size. Thus, in one embodiment, the lowest 12-bits of the address (i.e., the partial address shown in TLP 2 (208) and TLP 3 (210)) are sent in every TLP. In this example, assume the upper 52-bits of address remain the same for TLP 1 (206), TLP 2 (208), and TLP 3 (210) so the upper 52-bits are only sent over in TLP 1 (206).

In one embodiment, the TLPs using the compression features need not be contiguous TLPs. For example, in one embodiment, a standard PCI-Express™ TLP can be sent between compressed packets.

The receiver stores address bits 63:12 from TLP 1 (206) in Storage Loc 1 within storage 204. Subsequently, when TLP 2 (208) arrives at receiver 202, it has the same storage pointer, which points to the 63:12 address bits that were already stored from TLP 1 (206). In this embodiment, receiver 202 recalls upper address bits 63:12 from Storage Loc 1 and combines those bits with the lower 12 bits (partial address [11:0] received in TLP 2 (208)). Finally, receiver 202 performs the same combination between upper address bits 63:12 from Storage Loc 1 with the lower 12 bits (partial address [11:0] received in TLP 3 (210)). The process in this example allows three TLPs to be sent across the interconnect with a total of 88 bits (64+12+12=88 bits) of address information sent in comparison to a total of 192 bits (64+64+64=192) of address information that would have been sent absent this compression scheme.

In one embodiment, information other than just basic address information is stored in one or more of the storage locations. For example, in one embodiment, function bits, device number bits, and bus number bits can also be stored in locations. In other embodiments, it may be assumed that the bus number and device number do not change regularly from packet to packet. This information can be retrieved from a configuration register (such as a static register) and the function number and address bits [63:12] is changed. In this embodiment, the function number and address bits [63:12] and are stored and retrieved from the storage locations.

Figure 3:
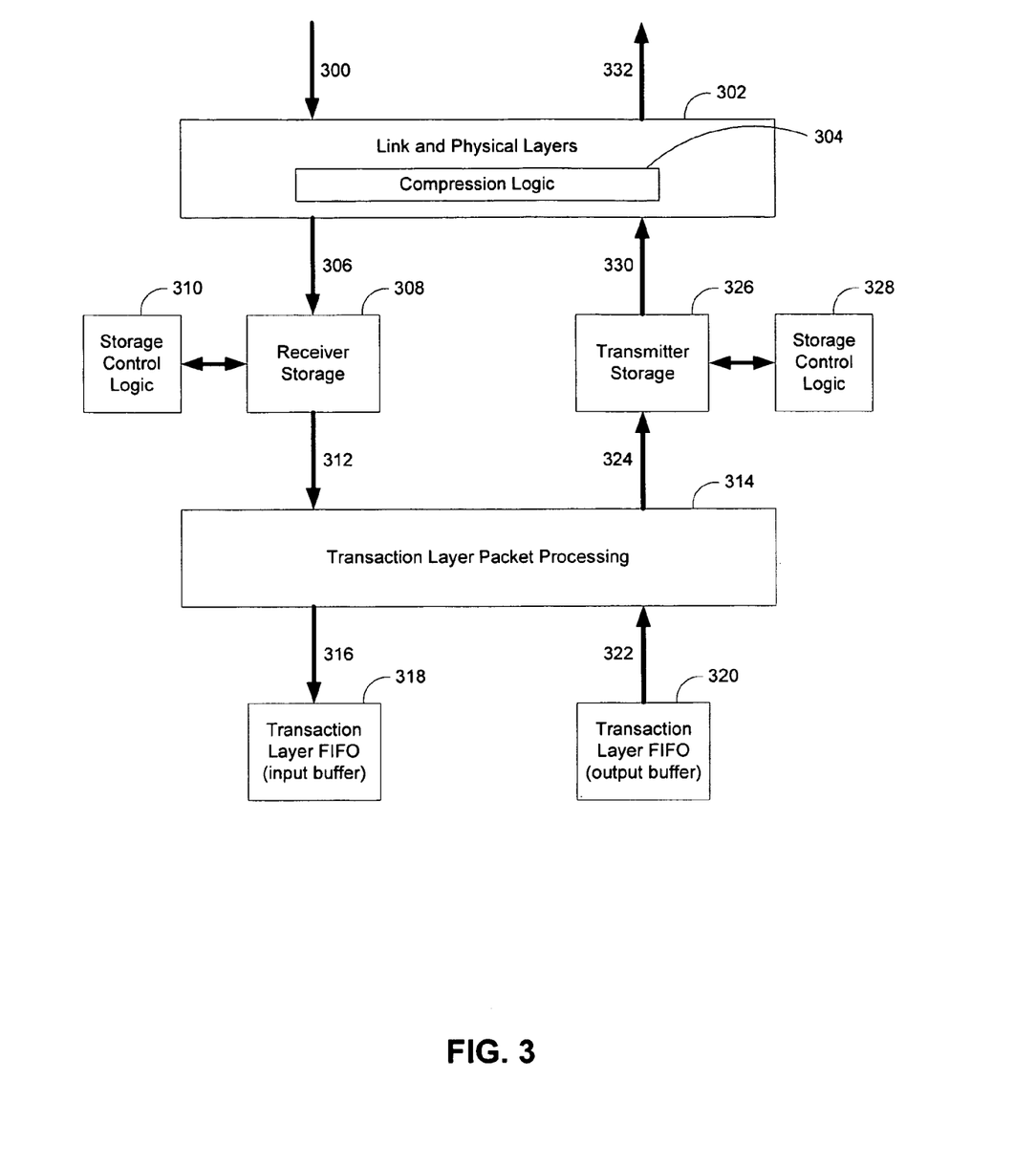
FIG. 3 illustrates one embodiment of PCI-Express™ TLP receiving and transmitting logic within a device capable of implementing a TLP compression and decompression scheme.

FIG. 3 illustrates one embodiment of PCI-Express™ TLP receiving and transmitting logic within a device capable of implementing a TLP compression and decompression scheme. In one embodiment, a TLP is received from a PCI-Express™ interconnect 300 through the link and physical layers of the device 302. Compression logic 304 within the link and physical layers 302 determines whether the TLP is compressed or not. If the TLP is compressed, the compression logic 304 decompresses the TLP, including the header.

The decompressed TLP information is sent along data path 306. In one embodiment, the TLP includes header address compression (as discussed in detail with reference to FIG. 2). In this embodiment, if the TLP had a full address, a partial address (upper address bits 63:12 as discussed in reference to FIG. 2) may be stored in receiver storage 308 based on a determination by the storage control logic 310. Furthermore, in this embodiment, if the TLP had a partial address including only lower address bit 11, a partial address of upper address bits 63:12 may be recalled from a location in receiver storage 308 and combined with lower address bit 11 based on a determination by the storage control logic 310.

In one embodiment, compression logic 304 recreates a standard TLP as defined by the PCI-Express™ specification from a compressed TLP that it received. The standard TLP is sent along data path 312 to the transaction layer packet processing unit 314. The standard TLP is deconstructed in the transaction layer packet processing unit 314 and the data payload is sent along data path 316 to the transaction layer first in first out (FIFO) input buffer 318 for further processing and the decompression process within the receiving unit of the device is complete.

Alternatively, if a data payload needs to be sent across the interconnect from the device in a TLP, in one embodiment the data payload is received from device logic by the transaction layer FIFO output buffer 320. Once through the FIFO, the data payload is sent along data path 322 to the transaction layer packet processing unit 314. The transaction layer packet processing unit 314 constructs a TLP for the data payload and sends the newly constructed TLP across data path 324. In one embodiment, the transmission logic keeps track of common bits to compress such as bus number, device number, function number, and upper address bits stored in the receiver that receives the TLP. In this embodiment, transmitter storage 326 keeps track of any upper address bits stored on the target receiver device in order to keep track of which TLPs sent need to send full addresses and which storage locations in the receiver storage unit have relevant upper address bits stored. Thus, in this embodiment, transmitter storage 326 has a copy of the receiver storage locations with upper address bits and storage control logic 328 tracks and modifies transmitter storage 326 accordingly when TLPs with address (i.e., header) compression are being transmitted.

In one embodiment, the transmitter is responsible for maintaining the storage structures in its transmit path and the receiver on its receive path. In one embodiment, only one device in a PCI-Express™ link between two devices has compression logic for only one direction. For example, a north bridge of a PCI-Express™ chipset may only have the receive storage and logic and a PCI-Express™ endpoint (such as a storage controller endpoint) only has the transmit storage. In this example, only the direct memory access (DMA) traffic initiated by the endpoint is compressed, as opposed to memory mapped input/output (MMIO) writes and reads originating from the CPU or from a peer device. In this example, the DMA read requests as well as writes being generated by the endpoint would be compressed, which is covered by the transmit storage of the endpoint as well as the receive storage of the north bridge of a PCI-Express™ chipset.

Returning to FIG. 3, next, the TLP is sent along data path 330 to the link and physical layers 302 and the TLP is compressed by compression logic 304. Finally, the compressed TLP is sent across the interconnect 332 to the receiver.

In one embodiment, the requester (i.e., transmitter) keeps separate storage for payload transactions vs. control transactions. The separate storage helps if an application has a lot of consecutive payload data accesses until a large portion of data is transferred (up to an OS page boundary on occasion).

In one embodiment, the requestor can have a fixed or programmable allocation of storage space. In another embodiment, the allocation of storage space is dynamic in nature, and can be managed based on access patterns.

In one embodiment, the requestor/transmitter manages the receivers storage buffers. Whenever a new entry is created due to an access, either by writing the entry to an empty storage location, or by replacing an existing entry in a storage location, the requestor/transmitter sends a command to inform the receiver to update its corresponding entry in its storage structure.

In one embodiment, software initially programs the available storage for compression based on the least amount of storage space available on the requestor/transmitter and the receiver. Thus, if the requestor has the least amount of space of the two devices, the receiver's storage space is limited accordingly, and vice versa.

In one embodiment, the north bridge in a PCI-Express™ enabled chipset has a common storage structure that can be allocated among multiple endpoints. In this embodiment, the common storage structure can be partitioned in accordance with a PCI-Express™ link that is partitioned. For example, a ×16 link can be partitioned into multiple ×8,×4, and/or ×2 links and the shared storage space for compression can be accordingly partitioned to accommodate the multiple links.

In one embodiment, the fields of a compressed TLP are shown in Table 2.

TABLE 2

Compressed TLP fields.

| Field | Length |
| --- | --- |
| Reserved symbol (K28.4) marking the start of the compressed TLP. | 10 bits |
| Compressed header. | 1-4 DW |
| Compressed data payload. | 0-256 DW |
| Link CRC. | 0.5-1 DW |
| Symbol marking the end of the TLP. | 10 bits |

In this embodiment, the first field in the compressed TLP is a reserved symbol. The PCI-Express™ specification has defined three reserve symbols: K28.4, K28.6, and K28.7. In one embodiment, a compressed TLP has K28.4 as the beginning symbol. In this embodiment, a PCI-Express™ device that is capable of TLP compression will recognize the TLP as a compressed packet because of the K28.4 symbol at the beginning of the packet as opposed to the standard STP symbol (K27.7) and will handle the rest of the TLP accordingly. The K28.4 symbol is 10 bits long.

In one embodiment, the next field in the compressed TLP is the compressed header. The sequence number is not necessary in the compressed TLP in one embodiment because information in the compressed header as well as logic in the receiving device make the sequence number implicit, as will be discussed in greater detail below. The reserved field in the PCI-Specification standard definition is also not necessary because the data is invalid and not used, therefore not important to keep. In one embodiment, compression logic contained within a device implementing the PCI-Express™ TLP compression scheme will remove these fields.

Returning to the compressed header field, in one embodiment, the compressed header is between 1 and 4 DW in length. The compressed header will be described in detail with reference to Tables 3-7 below.

In one embodiment, the next field in the compressed TLP is the compressed data payload. In many embodiments, the data payload is compressed by one or more of the many available data compression schemes available. In another embodiment, the data payload is not compressed. Thus, in different embodiments, the data payload in the compressed TLP is between 0 and 256 DW in length depending upon the type of transaction, the original size of the data payload, the compression scheme, or the lack of a compression scheme.

In one embodiment, the next field in the compressed TLP is the link cyclic redundancy check (CRC). The logic within a PCI-Express™ device performs a link CRC checksum operation to determine whether any information in the TLP is invalid due to data errors. In one embodiment, the link CRC field is the same size as the link CRC field in the standard TLP, 1 DW as discussed above. In another embodiment, the link CRC field is half the size as the link CRC field in the standard TLP, 1 Word. In this embodiment, the lower CRC error coverage is exchanged for a savings of 1 Word per TLP with a 1 Word link CRC incorporated. In one embodiment, the link CRC is only sent once for a group of TLPs. In this embodiment, the link CRC is computed once for a plurality of TLPs as one error checksum instead of individual checksums computed for each TLP in the group.

Figure 4:
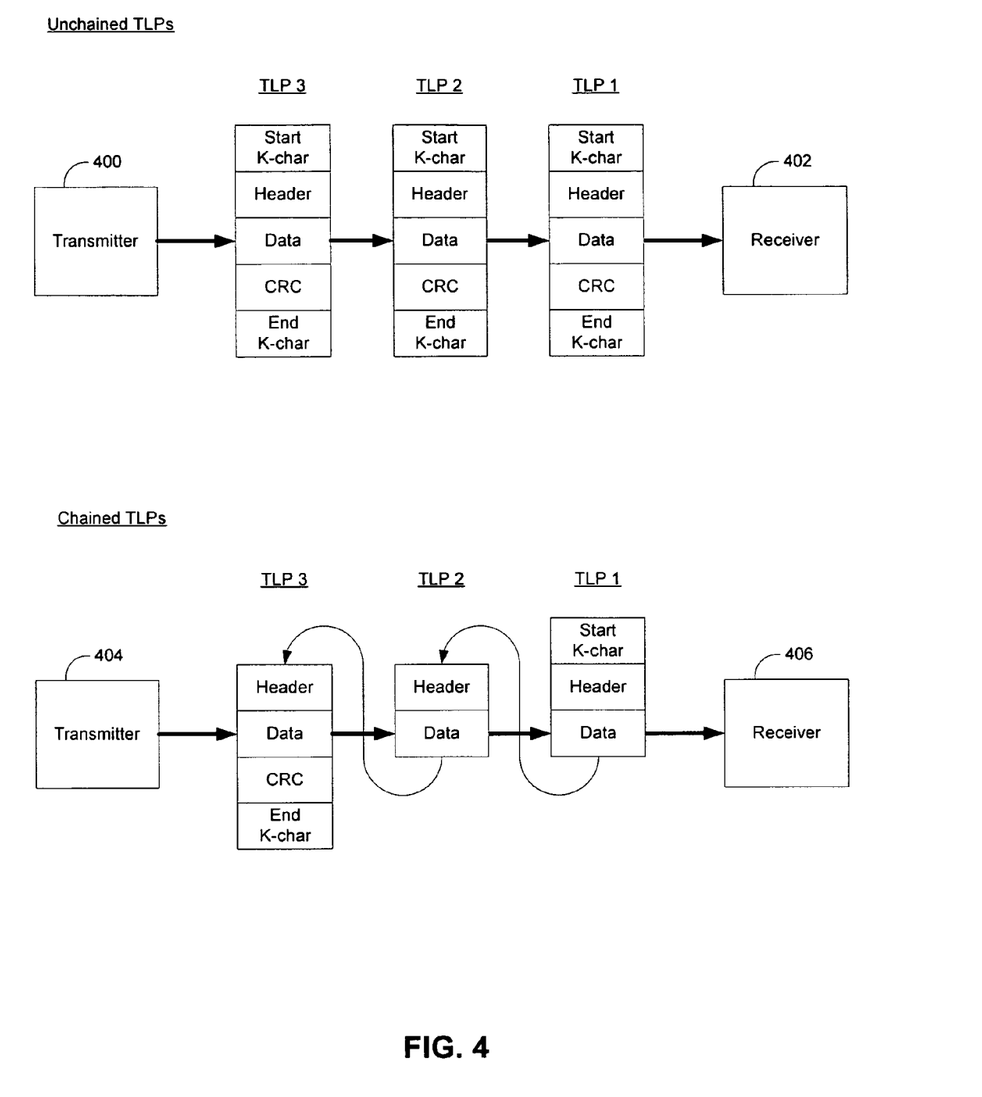
FIG. 4 illustrates one embodiment of a process to chain TLPs together to allow elimination of redundant data.

Referring now to the next figure, FIG. 4 illustrates one embodiment of a process to chain TLPs together to allow elimination of redundant data. First, an example of unchained TLPs is shown in the upper portion of the figure. Transmitter 400 sends three unchained TLPs to receiver 402. Each of the unchained TLPs have the exact same number of fields. TLP 1, TLP 2, and TLP 3 all have a start K-character, a header, a data payload, a link CRC, and an end K-character (these fields are described in greater detail above in reference to Table 2). Alternatively, with chained TLPs, as seen in the lower half of the figure, there are a number of fields for the same three TLPs that are able to be eliminated because their usage is redundant. If the TLPs are linked, the physical and link layer overheads, the K-chars and the link CRC, only have to be included once in the entire chain and their overhead can be amortized over the entire chain.

For example, in this embodiment, transmitter 404 sends three linked TLPs, TLP 1, TLP 2, and TLP 3 across the interconnect to receiver 406. Using a Chained TLP bit field (discussed in greater detail below in reference to Tables 4-6) in the modified compressed header, the receiver 406 is able to distinguish a chained versus non-chained TLP. In this embodiment, transmitter sends TLP 1 with a start K-char, a header, and a data payload. If the Chained TLP bit is set in the header of TLP 1, the receiver 406 knows that after the data payload of TLP 1 has been received, a second header from TLP 2 will immediately follow. This allows for the elimination of all bits associated with the TLP 1 link CRC, TLP 1 end K-char, and TLP 2 start K-char. Again, the receiver 406 will check the Chained TLP bit in the header for TLP 2.

In this example, once again the bit is set, so the receiver 406 again knows that after the TLP 2 data payload has been received, the header for TLP 3 will immediately follow. This again eliminates a number of bits: all bits associated with the TLP 1 CRC, TLP 1 end K-char, TLP 2 start K-char, TLP 2 link CRC, TLP 2 end K-char, and TLP 3 start K-char. Once again, the receiver 406 will check the Chained TLP bit in the header for TLP 3. In this example, the bit is not set, so the receiver knows that TLP 3 is the last TLP in the chain. Thus, after the TLP 3 data payload has been received, there will be a TLP 3 link CRC and a TLP 3 end K-char. The receiver 406 utilizes the TLP 3 link CRC for a single checksum error detection on all three packets simultaneously.

In one embodiment, the sender calculates link CRC to be sent as if the sequence number and the reserved 10-bit values, both removed during compression, were present. In this embodiment, the receiver can predict the sequence number and calculates the expected link CRC assuming the sequence number and reserved fields were present.

The compressed header in a compressed TLP contains a number of fields of information. In many embodiments, the fields within the compressed header are significantly different than the fields within a standard TLP header. In one embodiment, the first field within compressed header is a command field. Table 3 describes one embodiment of the set of possible commands represented by the command field. The command field is 2 bits long and has four possible commands. In this embodiment, the commands that are available in the compression scheme are a memory read, memory write, completion, and an extended header command. The extended header command is utilized to send a full address when necessary from the receiver to the sender (as discussed in detail in reference to FIG. 2).

TABLE 3

Command field in compressed TLP.

| Field | Bit(s) | Comments |
| --- | --- | --- |
| Command | [1:0] | 00b: Memory Read<br>01b: Memory Write<br>11b: Completion<br>10b: Extended Header used to store the Requestor ID and/or the page address in the receiver for the request and/or its outgoing completion |

Table 4 describes one embodiment of a compressed header for a memory read transaction. In this embodiment, bits [1:0] are the Command field (as discussed in reference to Table 3). In a compressed memory read transaction TLP, these bits are set to 00b. Bits [6:2] are the Upper Address Pointer that points to a location in the receiver storage where the upper address bits are located. In one embodiment, the receiver storage can store the Function [2:0] bits as well to specify the particular function of the device. In this embodiment, the bus number and device number for the transactions are fixed for the transmitting devices and the receiver retrieves them through a configuration register programmed by software.

Bits [16:7] are the lower [11:2] bits of the address, which is the address offset. Bits [18:17] specify the attributes (Attr[1:0]). The attribute field is identical to the same named field in the PCI-Express™ specification. Bits [28:19] are the Length of the read data payload. This Length is in DWs so the payload can be anywhere from 0 to 1024 DW. Next, bits [30:29] are reserved, and as such are invalid data. Finally, bit [31] is a Chained TLP bit. When this bit is set, it signifies that the next TLP received will be chained to the current TLP. When TLPs are chained, the physical and link layer overheads, the K-chars and the link CRC, only have to be included once in the entire chain and their overhead can be amortized over the entire chain.

TABLE 4

Compressed header for memory read.

| Field | Bit(s) | Comments |
| --- | --- | --- |
| Command[1:0] | [1:0] | 00b: Memory Read |
| Function and Upper Address Pointer [4:0] | [6:2] | Pointer to location in receiver where {Function[2:0], Addr[63:12]} is stored. |
| Address [11:2] | [16:7] | Address offset. |
| Attr [1:0] | [18:17] | Same as PCI Express definition. |
| Length [9:0] | [28:19] | Max payload size is 1024 DW (4096 Bytes), the same as PCI Express definition. |
| Reserved | [30:29] | Invalid data. |

TABLE 4-continued

Compressed header for memory read.

| Field | Bit(s) | Comments |
| --- | --- | --- |
| Chained TLP | 31 | When set to 1, this bit implies that another TLP payload is put together in this packet. |

Table 5 describes one embodiment of a compressed header for a memory write transaction. In this embodiment, bits [1:0] are the Command field (as discussed in reference to Table 3). In a compressed memory write transaction TLP, these bits are set to 01 b. Bits [6:2] are the Upper Address Pointer (referred to as the Storage Pointer in FIG. 2), which points to a location in the receiver storage where the upper address bits are located. In one embodiment, the receiver storage can store the Function [2:0] bits as well to specify the particular function of the device. In this embodiment, the bus number and device number are static and retrieved from a configuration register programmed by software.

In one embodiment, a requestor may keep posted and non-posted entries separate. Posted versus non-posted entries are defined within the PSI-Express™ Specification. In this embodiment, the allotted storage structures can double in number of entries because the posted and non-posted writes can be distinguished based on the Command field.

Bits [16:7] are the lower [11:2] bits of the address, which is the address offset. Bits [18:17] specify the attributes (Attr[1:0]). The attribute field is identical to the same named field in the PCI-Express™ specification. Bits [25:19] are the Length of the read data payload. This Length is in DWs so the payload can be anywhere from 0 to 128 DW. Next, bits [30:26] are for Data Encoding. The Data Encoding bits specify what, if any, compression scheme(s) are used for the data payload. The data payload can be encoded with any standard compression scheme. There are numerous compression schemes utilized in the computer industry today. Thus, in one embodiment, the transmitter device can test a plurality of compression schemes on the data to see which one results with the best compression ratio. The 5-bit Data Encoding field allows for 32 different compression schemes to choose from. Again, finally, Bit [31] is a Chained TLP bit (explained more thoroughly above in reference to Table 4).

TABLE 5

Compressed header for memory write.

| Field | Bit(s) | Comments |
| --- | --- | --- |
| Command[1:0] | [1:0] | 01b: Memory Write |
| Function and Upper Address Pointer [4:0] | [6:2] | Pointer to location in receiver where {Function[2:0], Addr[63:12]} is stored. |
| Address [11:2] | [16:7] | Address offset |
| Attr [1:0] | [18:17] | Same as PCI Express definition |
| Length [6:0] | [25:19] | Max payload size is 128 DW (512 Bytes). The encoding is the same as PCI Express definition |
| Data Encoding | [30:26] | Data encoding implementation depends on the type of compression algorithms used with various |
| Chained TLP | 31 | When set to 1, this bit implies that another TLP payload is put together in this packet. |

Table 6 describes one embodiment of a compressed header for a completion transaction. In this embodiment, bits [1:0] are the Command field (as discussed in reference to Table 3). In a completion transaction TLP, these bits are set to 11 b. Next, bit [2] is the Compressed Header bit. It specifies whether the header is compressed or not. Next, bits [5:3] are the 3-bit Function number, which specifies the function number of the requestor to which the completion is sent. Next is the Tag field, bits [13:6], which specifies the address offset. Bits [20:14] are the Length field, which specifies the length of the data payload (the same as a memory write transaction discussed above in reference to Table 5). Bits [25:21] are Reserved and thus are invalid data. Bits [30:26] are for Data Encoding. Detailed information regarding data encoding can be found above regarding memory write transactions (referencing Table 5). Again, finally, there is a Chained TLP bit located in bit [31]. The Chained TLP bit is explained more thoroughly above in reference to Table 4.

TABLE 6

Compressed header for completion.

| Field | Bit(s) | Comments |
| --- | --- | --- |
| Command[1:0] | [1:0] | 11b: Completion |
| Compressed Header | 2 | A 1 indicates the header is compressed, 0 indicates the header is uncompressed. |
| Function[2:0] | [5:3] | Requestor function number. |
| Tag[7:0] | [13:6] | Address offset. |
| Length [6:0] | [20:14] | Length. |
| Reserved | [25:21] | Invalid data. |
| Data Encoding | [30:26] | Data encoding implementation depends on the type of compression algorithms used with various components for various endpoints. |
| Chained TLP | 31 | When set to 1, this bit implies that another TLP payload is put together in this packet. |

Table 7 describes one embodiment of a compressed header for an extended address transmission. In this embodiment, bits [1:0] are the Command field (as discussed in reference to Table 3). In an extended address transmission TLP, these bits are set to 10b. Next, bit [2] is a Read/Write bit that specifies to the receiver that the transaction is a memory read or a memory write. Then, bits [7:3] are the Upper Address Pointer that points to a location in the receiver storage where the upper address bits are located. In one embodiment, the receiver storage can store the Function [2:0] bits as well to specify the particular function of the device.

Bits [17:8] are the lower [11:2] bits of the address, the address offset. Bits [19:18] specify the attributes (Attr[1:0]). The attribute field is identical to the same named field in the PCI-Express™ specification. The next set of bits are the Length of the data payload. For reads, the Length field is 10 bits, bits [29:20]. The Length field represents DWs so the read payload can be anywhere from 0 to 1028 DW. For writes the Length field is 7 bits, bits [26:20], thus a write payload can be anywhere from 0 to 128 DW. If the transaction is a write, bits [31:27] are for Data Encoding. Detailed information regarding Data Encoding can be found above regarding memory write transactions (in reference to Table 5). If the transaction is a read, bits [31:30] are reserved and therefore invalid.

Next, bits [91:32] are the Device/Function/Address upper address bits. These bits, when combined with the address offset in this particular transaction or any of the other three transactions referenced above make a complete address. Next, bits [94:92] are reserved and therefore invalid. In this particular example, the compressed header for the transmission of the extended address is 3 DW long. In another embodiment, a 4th DW can be utilized to provide additional address information. The last bit in the 3rd DW, bit [95], specifies whether the next DW received (the 4th DW of this transaction) is utilized. In one embodiment, if it is utilized, the 4th DW contains the bus number.

TABLE 7

Compressed header for extended address transmission.

| Field | Bit(s) | Comments |
|---|---|---|
| Command[1:0] | [1:0] | 10b: Extended Header used to store the Requestor ID and/or the page address in the receiver for the request and/or its outgoing completion |
| Read/Write | 2 | 0 = read, 1 = write |
| Function and upper address pointer [4:0] | [7:3] | Pointer to location in receiver where {Function[2:0], Addr[63:12]} is stored. In one embodiment, this points to Bus[7:0] and Dev[4:0] |
| Address [11:2] | [17:8] | Address offset |
| Attr [1:0] | [19:18] | Same as PCI Express definition |
| Length [9:0] for read, Length [6:0] for write | [29:20] for read, [26:20] for write | Read: Same as PCI-Express Specification format, max payload size is 1028 DW (4096 Bytes). Write: Max payload size is 128 DW (512 Bytes). The encoding is the same as PCI Express definition except all bits 0 is a 512 Byte payload. |
| Data encoding for write | [31:27] for write | Data encoding implementation depends on the type of compression algorithms used with various components for various endpoints. For write only. |
| Reserved (for read) | [31:30] for read | Reserved if a read. Invalid data. |
| Device, Function, Address[63:12] | [91:32] | Upper address bits and Device/Function. This can be extended to higher bits in the reserved space. |
| Reserved | [94:92] | Reserved. Invalid data. |
| 4 DW header | [95] | If bit is set to 1, next DW is used for Bus Number. |

Figure 5:
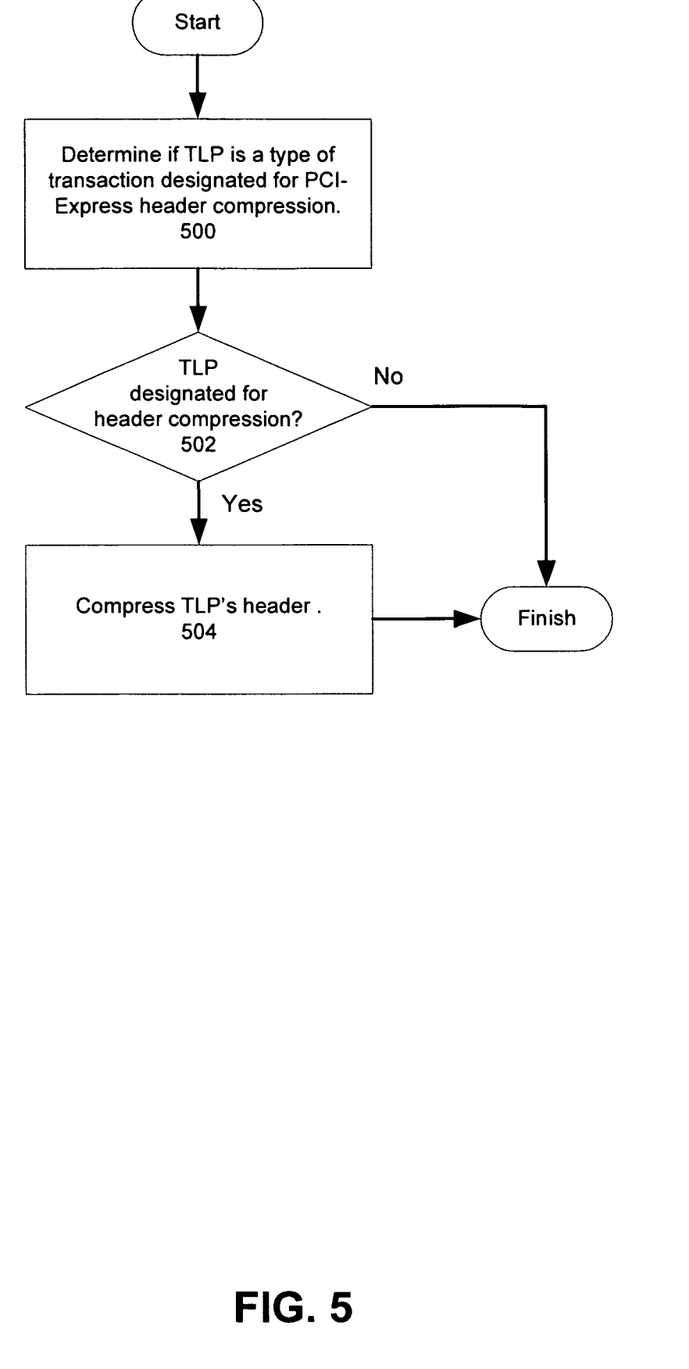
FIG. 5 is a flow diagram of an embodiment of a method implement TLP header compression.

FIG. 5 is a flow diagram of an embodiment of a method implement TLP header compression. The process is performed by processing logic that may comprise hardware (circuitry, dedicated logic, etc.), software (such as is run on a general purpose computer system or a dedicated machine), or a combination of both. The process begins by processing logic determining if a TLP is a type of transaction designated for PCI-Express™ header compression (processing block 500). In one embodiment, only certain types of memory read, memory write, completion, and extended address header transactions are types of transactions designated for header compression. Next, if the TLP is designated for header compression (processing block 502), then processing logic compresses the TLPs header (processing block 504) and the process is finished. Otherwise, the process is finished without compressing the header if the transaction is not a type designated for header compression.

Figure 6:
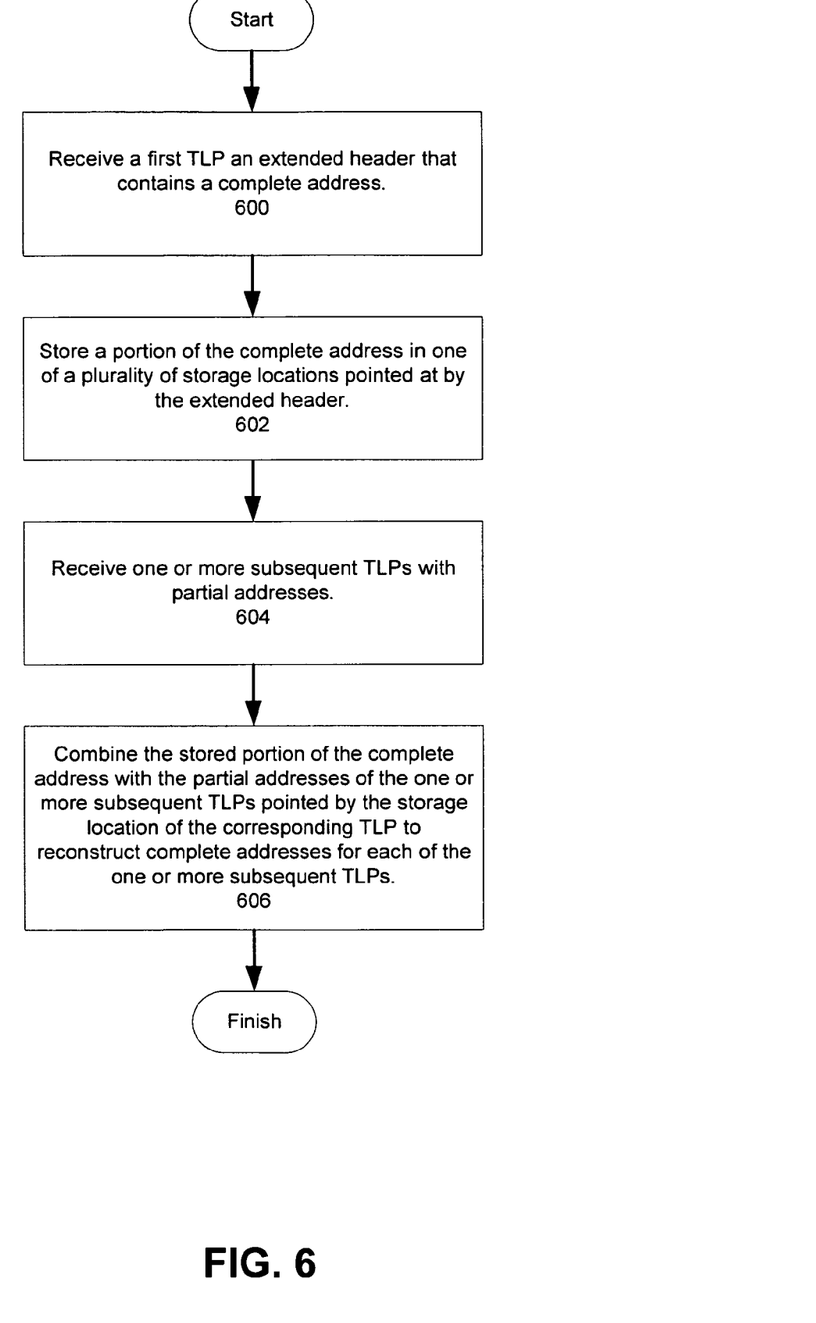
FIG. 6 is a flow diagram of an embodiment of a method to implement header compression utilizing partial addresses.

Now turning to the next figure, FIG. 6 is a flow diagram of an embodiment of a method to implement header compression utilizing partial addresses. The process is performed by processing logic that may comprise hardware (circuitry, dedicated logic, etc.), software (such as is run on a general purpose computer system or a dedicated machine), or a combination of both. The process begins by processing logic receiving a first TLP with a complete address (processing block 600). Next, processing logic stores a portion of the complete address in one of a plurality of storage locations (processing block 602) pointed at by the extended header of the received TLP. The storage locations are described in greater detail in reference to FIGS. 2 and 3. Next, processing logic may receive one or more subsequent TLPs with partial addresses (processing block 604). Finally, processing logic combines the stored portion of the complete address with the partial addresses of the one or more subsequent TLPs to reconstruct complete addresses for each of the one or more subsequent TLPs (processing block 606) and the process is finished.

Figure 7:
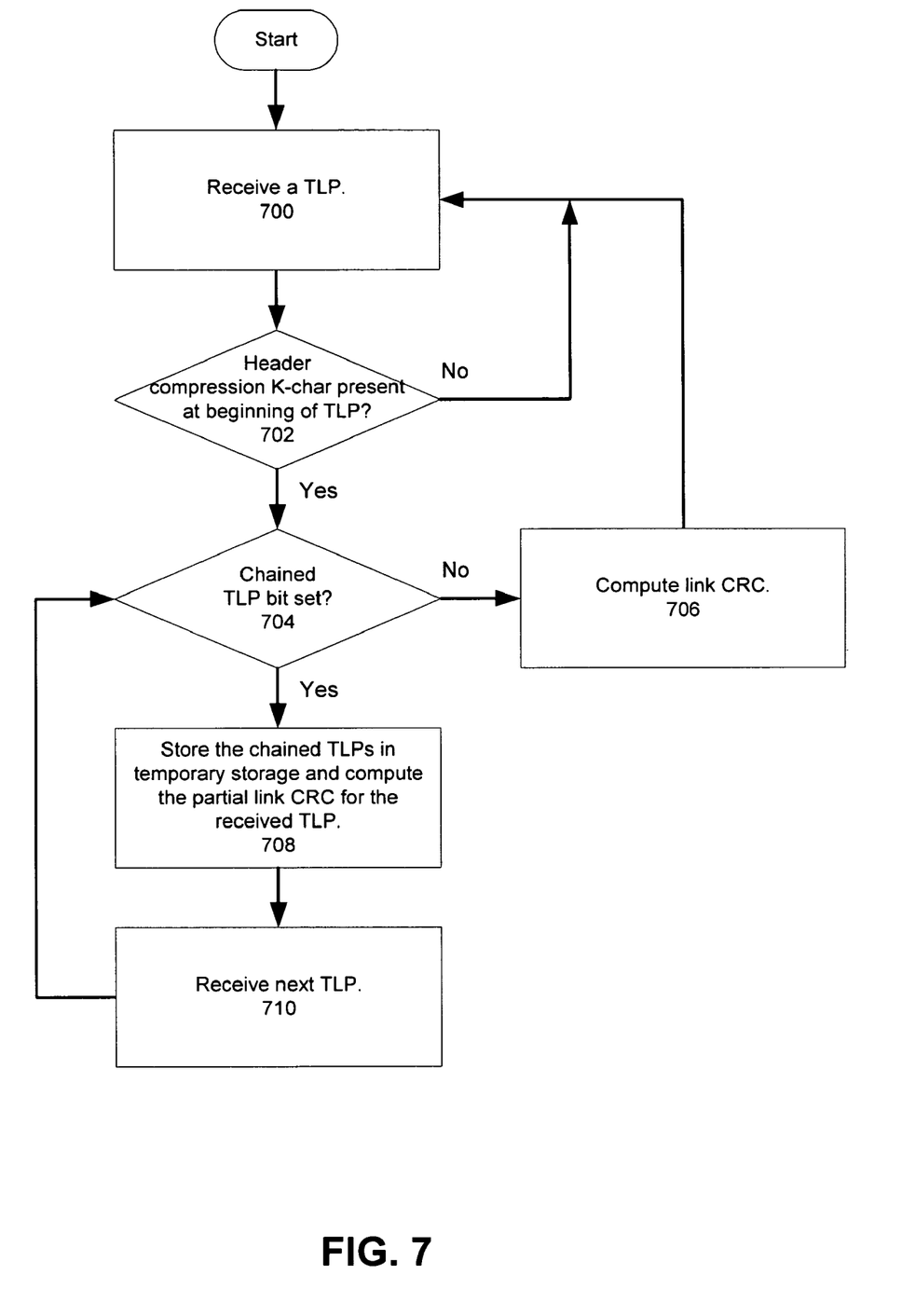
FIG. 7 is a flow diagram of an embodiment of a method to implement TLP chaining.

Now turning to the next figure, FIG. 7 is a flow diagram of an embodiment of a method to implement TLP chaining. The process is performed by processing logic that may comprise hardware (circuitry, dedicated logic, etc.), software (such as is run on a general purpose computer system or a dedicated machine), or a combination of both. The process begins by processing logic receiving a TLP (processing block 700). Next, processing logic checks to see if there is a K-character at the beginning of the TLP indicating header compression (processing block 702). If the K-character does not indicate header compression then the TLP is processed as a standard PCI-Express™ TLP and the process restarts and another TLP is received. Otherwise, if there is a K-character at the beginning of the TLP indicating header compression (such as K28.4) then processing logic checks to see if the Chained TLP bit is set within the compressed header in the received TLP (processing block 704). If the Chained TLP bit is not set, it indicates that no subsequent TLPs are chained. If this is the case, processing logic then computes the link CRC of the single or potentially multiple chained TLPs of which the current TLP is the last one (processing block 706). Otherwise, if the Chained TLP bit is set, then processing logic stores the TLP in its temporary storage and computes the partial CRC with the current TLP (processing block 708). Next, processing logic receives the next TLP processing block 710) and the received TLP is again checked to see if the Chained TLP bit in the compressed header is set. This process continues until CRC Chained TLP bit is not set whereupon processing logic computes the link CRC for all TLPs in the chain (processing block 706).

Embodiments of a system, method, and device to implement PCI-EXPRESS™ Transaction Layer Packet compression are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising a non-transitory medium including a processor, which executes logic, the logic to:
   determine whether a received current transaction layer packet (TLP) has a compressed header;
   decompress the header in response to the received current TLP having a compressed header;
   set a chained TLP bit in the compressed TLP header if a next TLP is designated to be chained to the current TLP;
   insert a K-character specifying header compression at the beginning of a first TLP in a group of TLPs to be chained together;
   set the chained TLP bit in every TLP header in the group except the last;
   insert link cyclic redundancy check (CRC) information in the last TLP in the group; and insert a K-character specifying the end of a TLP at the end of the last TLP in the group to be chained.

2. The device of claim 1, further comprising a memory to store a plurality of TLP partial addresses.

3. The device of claim 2, further comprising logic to combine a portion of a partial address received from the decompressed header with one of the plurality of TLP partial addresses stored in the memory.

4. The device of claim 1, further comprising:
   logic to receive a plurality of chained TLPs, wherein the last TLP in the chain has link cyclic redundancy check (CRC) information for the plurality of chained TLPs; and
   logic to calculate a single link CRC value using the link CRC information.

5. A system, comprising:
   a first device coupled to an interconnect, the first device comprising a non-transitory medium including a processor, which executes logic, the logic to:
      compress a Peripheral Component Interconnect Express (PCI-Express) current transaction layer packet (TLP);
      send the compressed TLP over the interconnect;
      compress the header of the TLP;
      set a chained TLP bit in the compressed TLP header if the next TLP is designated to be chained to the current TLP;
      insert a K-character specifying header compression at the beginning of a first TLP in a group of TLPs to be chained together;
      set the chained TLP bit in every TLP header in the group except the last;
      insert link cyclic redundancy check (CRC) information in the last TLP in the group;
      insert a K-character specifying the end of a TLP at the end of the last TLP in the group to be chained; and
   and a second device coupled to the interconnect, the second device comprising a non-transitory medium including a processor, which executes logic, the logic to:
      receive the compressed TLP from the interconnect;
      decompress the received TLP; and
      decompress the header of the received TLP.

6. The system of claim 5, wherein the first device further comprises logic to:
   send a first TLP with a complete address across the interconnect; and
   subsequently send one or more TLPs with partial addresses across the interconnect.

7. The system of claim 6, wherein the second device further comprises a plurality of storage locations each to store at least a portion of the address located in the header of a TLP.

8. The system of claim 7, wherein the second device further comprises logic to:
   receive the first TLP with the complete address from the interconnect;
   store a portion of the complete address in one of the plurality of storage locations;
   receive the one or more subsequent TLPs with partial addresses from the interconnect; and
   combine the stored portion of the complete address with the partial addresses of the one or more subsequent TLPs to reconstruct complete addresses for each of the one or more subsequent TLPs.

9. The system of claim 6, wherein the complete address includes a bus number, a device number, and a function number of the device.

10. The system of claim 5, wherein the first device further comprises logic to insert the K-character specifying header compression at the beginning of each TLP in the group of TLPs.

11. The system of claim 10, wherein the second device further comprises logic to determine whether a received TLP has a compressed header by reading the K-character at the beginning of each TLP.

12. The system of claim 5, wherein the second device further comprises logic to:
   determine if the chained TLP bit is set if a header compression K-character is present at the beginning of a received TLP;
   receive one or more subsequent TLPs if the chained TLP bit is set, wherein a determination is made whether the chained TLP bit is set for each of the one or more subsequent TLPs, until the chained TLP bit is not set for a received subsequent TLP; and
   compute the link CRC for the received chain of TLPs by utilizing the link CRC information present in the last received TLP.

13. The system of claim 5, wherein the TLP includes a command that is a memory read, memory write with data payload, completion with data payload, or an extended header with full address information.

* * * * *